(12) United States Patent
Hudson et al.

(10) Patent No.: US 7,824,727 B2
(45) Date of Patent: Nov. 2, 2010

(54) METHOD OF MAKING A LIQUID EGG COMPOSITION WITH FISH OIL

(75) Inventors: Margaret F. Hudson, Toronto (CA); Phillip Lee Wing, Markham (CA); Elyse Beauregard, St. Rosalie (CA)

(73) Assignee: Burnbrae Farms Limited, Lyn, Ontario (CA)

( * ) Notice: Subject to any disclaimer, the term of this patent is extended or adjusted under 35 U.S.C. 154(b) by 534 days.

(21) Appl. No.: 11/111,924

(22) Filed: Apr. 22, 2005

(65) Prior Publication Data

US 2005/0186323 A1 Aug. 25, 2005

Related U.S. Application Data

(62) Division of application No. 10/094,962, filed on Mar. 12, 2002.

(60) Provisional application No. 60/281,728, filed on Apr. 6, 2001.

(51) Int. Cl.
*A23L 1/32* (2006.01)

(52) U.S. Cl. .................. 426/614; 426/605; 426/800; 426/801

(58) Field of Classification Search ................ 426/614, 426/605, 801, 800
See application file for complete search history.

(56) References Cited

U.S. PATENT DOCUMENTS

| | | | |
|---|---|---|---|
| 2,372,679 A | 4/1945 | Magid | |
| 3,840,683 A | 10/1974 | Strong et al. | |
| 4,921,705 A * | 5/1990 | Arai et al. | 424/450 |
| 5,053,490 A | 10/1991 | Satch et al. | 530/362 |
| 5,266,338 A | 11/1993 | Cascione et al. | |
| 5,431,934 A | 7/1995 | Vainerman et al. | |
| 5,455,054 A | 10/1995 | Bryson et al. | 426/106 |
| 5,604,258 A | 2/1997 | Ferrante et al. | 514/560 |
| 5,612,076 A | 3/1997 | Samimi et al. | 426/234 |
| 5,874,470 A | 2/1999 | Nehne et al. | |
| 5,897,890 A | 4/1999 | Scheideler | |
| 5,904,945 A | 5/1999 | Narabe et al. | |
| 6,149,964 A | 11/2000 | Theuer et al. | |
| 6,217,926 B1 | 4/2001 | Merkle et al. | 426/425 |
| 2003/0072787 A1 | 4/2003 | Wilson et al. | 424/442 |
| 2003/0149118 A1 | 8/2003 | Akashe et al. | |

FOREIGN PATENT DOCUMENTS

| | | |
|---|---|---|
| DE | 19756123 | 6/1999 |
| EP | 630578 | 12/1994 |
| EP | 1155627 | 11/2001 |

(Continued)

OTHER PUBLICATIONS

Gunstone. Modifying Llpis for Use in Food. Published 2006. pp. 56-79.*

(Continued)

*Primary Examiner*—Anthony Weier
(74) *Attorney, Agent, or Firm*—Michael I. Stewart; Sim & McBurney

(57) ABSTRACT

A novel food composition is provided in which omega-3 fatty acids, preferably including eicosapentaenoic acid (EPA) and docosahexaenoic acid (DHA), particularly in the form of fish oil, is provided in a liquid egg product.

13 Claims, 1 Drawing Sheet

FOREIGN PATENT DOCUMENTS

| | | | |
|---|---|---|---|
| JP | S12-119350 | | 9/1934 |
| JP | 60-47643 | * | 3/1985 |
| JP | 60-54648 | | 3/1985 |
| JP | 60-102168 | * | 6/1985 |
| JP | S58-208275 | | 6/1985 |
| JP | H1-140965 | | 5/1990 |
| JP | 3-183445 | | 8/1991 |
| JP | H3-290073 | | 8/1994 |
| JP | 7-8201 | | 1/1995 |
| JP | 8-173134 | * | 7/1996 |
| JP | H6-319885 | | 7/1996 |
| JP | H7-174081 | | 1/1997 |
| JP | H8-354058 | | 6/1998 |
| JP | 10-290929 | | 11/1998 |
| JP | 2001-61402 | * | 3/2001 |
| JP | H11-244902 | | 3/2001 |
| WO | WO 91/10367 | | 7/1991 |
| WO | WO 01/47377 | | 7/2000 |

OTHER PUBLICATIONS

U.S. Appl. No. 11/798,790, filed May 2007, Hudson et al.
U.S. Appl. No. 11/798,200, filed May 2007, Hudson et al.
Farrell, D. "The enrichment of poultry products with the omega n-3 polyunsaturated fatty acids: a selected review", Proceedings of Australian Poultry Science Symposium, University of Sydney, vol. 7, 1995 pp. 16-22.
Souci, Fachmann Kraut, "Food composition and nutrition tables 1989/90", WVG (Wissenschaftliche Verlagsgesellschaft MBH), Stuttgart, 4th revised and completed ed., 1989, pp. 127-128.

* cited by examiner

METHOD OF MAKING A LIQUID EGG COMPOSITION WITH FISH OIL

REFERENCE TO RELATED APPLICATIONS

This application is a division of U.S. patent application Ser. No. 10/094,962 filed Mar. 12, 2002, which claims priority under 35 USC 119(e) from U.S. Provisional Patent Application No. 60/281,728 filed Apr. 6, 2001.

FIELD OF INVENTION

This invention relates to a liquid egg product which contains nutritional additives, namely omega-3 fatty acids.

BACKGROUND TO THE INVENTION

Liquid egg, i.e. egg out of the shell, is conventionally subjected to pasteurization to eliminate *Salmonella* but the pasteurization conditions employed do not destroy all organisms capable of spoiling egg products held under refrigeration temperature above freezing (about 4° C.). The survival of spoilage organisms in pasteurized liquid whole egg product combined with conventional packaging technology, results in products with limited shelf-life, namely about 7 to 14 days at about 40° F. (about 4° C.). This requires freezing and frozen distribution systems to be employed.

In general, there is a temperature/time relationship with respect to conventional pasteurization conditions. It is also known that the shelf-life of liquid egg products can be increased by increasing the severity of the pasteurization conditions by increasing the pasteurization temperature for the same time period or increasing the time period for the same pasteurization temperature. Such ultrapasteurization provides a functionally acceptable liquid egg product with a longer shelf-life, from about 4 to about 36 weeks. A predetermined time and temperature are chosen for the ultrapasteurization procedure to impart a preselected shelf-life to the liquid egg product.

There has been increasing interest in the role of omega-3 fatty acids, found in fish and fish oils, for the prevention and management of cardiovascular disease as well as other health benefits. The omega-3 fatty acids (n-3 polyunsaturates) of particular interest for cardiovascular care include eicosapentaenoic acid (EPA; 20:5n-3) and docosahexaenoic acid (DHA; 22:5n-3). Omega-3 fatty acids also exist in plant sources, but mainly in the form of α-linolenic acid (ALA or LNA), which undergoes a small degree of metabolism to EPA and DHA.

The mean daily intake of EPA+DHA in a typical North American diet, namely approximately one fish serving every 10 days, approaches 0.13 g/day, or approximately 0.15% of the total dietary fat intake, well below recommended minimum levels for EPA +DHA of at least about 0.65 g/day, preferably about 1 g/day. This deficiency may be improved by increasing fish intake or fish oil intake.

However, many people find fish to have a "fishy" taste which militates against increased fish content in the diet. There is also a perception that fatty fish consumption is fattening. In addition, capsules of fish oil are sometimes found unacceptable for swallowing by many people. In addition, fish oil capsules can induce fishy tasting burpings, which many people find unpleasant, and nauseous.

SUMMARY OF INVENTION

The present invention provides a novel manner of delivering fish oil in sufficient quantity to meet dietary needs while avoiding the drawbacks of the prior art. In essence, the present invention uses liquid egg, i.e. egg out of the shell, as a carrier for omega-3 (n-3) fatty acids, particularly as found in fish oil. In accordance with the present invention, an emulsified liquid egg product is provided in which omega-3 fatty acids, including EPA and DHA, are homogeneously dispersed or dissolved. The liquid egg product masks any "fishy" taste and yet enables a daily minimum dosage of omega-3 fatty acids, particularly EPA and DHA, to be delivered. The liquid egg may be egg white, egg yolk or combinations thereof in any desired proportions, as discussed in more detail below.

Accordingly, in one aspect of the present invention, there is provided a food composition comprising liquid egg and at least one omega-3 fatty acid contained therein, preferably in an amount of about 100 to about 1500 mg of omega-3 fatty acid per 100 g of composition, more preferably about 500 to about 1000 mg of omega-3 fatty acid per 100 g of composition.

The omega-3 fatty acid preferably includes eicosapentaenoic acid (EPA) and/or docosahexaenoic acid (DHA). In a preferred embodiment, the omega-3 fatty acids are provided by fish oil, which is emulsified in the liquid egg. The fish oil may be present in an amount to provide about 0.65 or about 1.5 g of EPA+DHA per serving of 125 g of food composition, preferably in an amount of about 2 to about 5 wt % of the composition. However, plant sources of omega-3 fatting acids, including ALA, also may be used.

In accordance with another aspect of the present invention, there is provided a method of forming a food composition, which comprises forming an emulsion of at least one omega-3 fatty acid in liquid egg. The omega-3 fatty acids preferably include eicosapentaenoic acid (EPA) and/or docosahexaenoic acid (DHA), preferably provided in the form of fish oil. The fish oil is preferably utilized in an amount to provide about 0.65 to about 1.5 g of EPA+DHA per 125 g of food composition.

GENERAL DESCRIPTION OF THE INVENTION

Figure 1:
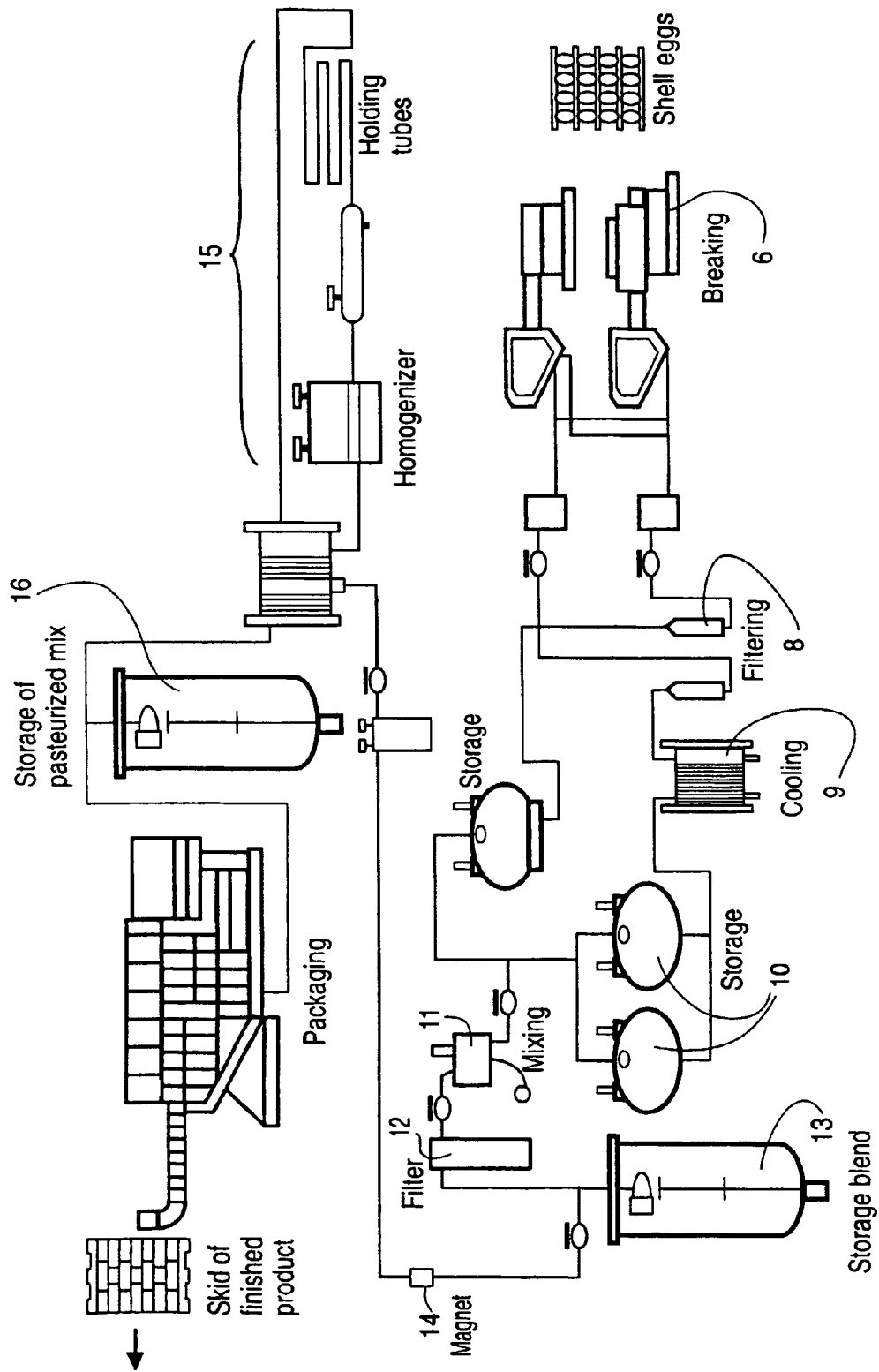
FIG. 1 is a schematic representation of a procedure employed in one embodiment for the production of the product of the present invention.

As noted above, the present invention provides a nutritious source of omega-3 fatty acids. The source of omega-3 fatty acids may be any convenient material containing such fatty acids, particularly those materials rich in EPA and/or DHA. Such source of omega-3 fatty acids is particularly provided by fish oils and the invention is described herein particularly with reference thereto. However, other sources of such fatty acids may be used, including algae, seal oil, flax oil, walnut oil and soybean oil. A mixture of such omega-3 fatty acid sources may be employed.

The amount of omega-3 fatty acid present in the liquid egg product may vary widely, depending on the source of the omega-3 fatty acid and its fatty acid profile. In general, the liquid egg product of the present invention contains about 100 to about 1500 mg of omega-3 fatty acids per 100 g of liquid egg product, preferably about 500 to about 1000 mg/100 g of liquid egg product.

In producing the liquid egg product of the invention, eggs may be first separated into albumen and yolks. Normally, whole eggs have about 60% white and about 40% yolk. In providing an egg product in accordance with one embodiment of the invention, a weight ratio of about 100:1 to about 1:100 albumen:yolk, preferably about 92:8, is employed. By reducing the proportion of egg yolk in relation to that present in whole eggs, the cholesterol and fat level of the product of the invention can be reduced in comparison to regular shell eggs. Egg white alone may be used, if desired, in providing the product of the invention. In addition, fish oil or other source of omega-3 fatty acids may be added to egg yolks alone to provide a concentrate for mayonnaise manufacturers and other products, to provide a more nutritional mayonnaise.

When employing both egg yolk and egg white, egg yolk and part of the egg white are first mixed together before the remainder of the egg white is blended into the mixture, in order to obtain a well blended and uniform mixture of egg white and egg yolk. Usually, about 40 to about 60% of the egg white is initially blended with all the egg yolk before the remainder of the egg white is blended in.

In addition, during blending in the remainder of the egg white, lecithin may be added as an emulsifier to assist in binding the fish oil into the liquid egg. Generally, about 0.1 to about 0.2 wt % of lecithin may be used, preferably about 0.125 to about 0.175 wt %. Other food-grade surface active agents may be employed including emulsifiers and modified starch, trogacanth gum, trogacanth replacers.

Since it is preferable to have a product similar in colour to fresh eggs, when less than the full yolk proportion of the egg is used, food-grade coloring may be added to increase the yellowness of the product. In general, beta carotene is used for this purpose, generally in an amount of about 0.04 to about 0.08 wt %, preferably about 0.05 to about 0.07 wt %. Other food-grade additives may be used to obtain similar results, including carrot extracts, anatto and various natural and synthetic colorants.

Another additive which may be employed is citric acid, which assists in holding the color when the liquid egg product is cooked, such as in making scrambled eggs or omelettes. Generally, about 0.04 to about 0.08 wt % of such citric acid, preferably about 0.05 to about 0.07 wt %, may be employed. Other materials which may be employed for this purpose include sodium pyrophosphate and monosodium phosphate.

A thickening agent, which may be prehydrated xanthan gum, also may be added, generally in an amount of about 0.03 to about 0.07 wt %, preferably about 0.04 to about 0.06 wt %. The presence of the xanthun gum imparts an additional mouth feel to the final cooked product. The xanthun gum also assists in particulate suspension and control of separation of oils and fats. The xanthun gum may be used in a blend with arabic gum. Other food-grade gums which may be used include guar, locust bean gum, karaya, carrageenans, arabic gum, agar gum, alginates, gum trogacanth, or blends of two or more of such gums.

Following blending of the balance of the egg white with the initial mixture of yolk and egg white, the fish oil also is blended into the mix. The amount of fish oil added depends on the concentration of the fish oil employed and generally is sufficient to provide, in a serving of egg product, such as scrambled eggs or omelettes, an amount equal to the recommended dietary amount of EPA and DHA, for example, from about 0.65 to about 1.5 g of EPA+DHA per serving of about 125 g of liquid egg product. In general, the amount of fish oil added is about 2 to about 5 wt % of the liquid egg product.

The present invention preferably utilizes menhaden fish oil, preferably refined to decrease or remove fish odor and taste. However, the oil from any oily fish may be used, including sardines, mackerel, trout, tuna, halibut and salmon, as well as mixtures of fish oils derived from two or more of such oily fish.

Other additives which may be used include egg yolk flavor, when less than the full yolk proportion of the egg is used, generally used in amounts of about 0.02 to about 0.04 wt % along with the fish oil.

Alpha tocopherols may be added to the product as a preservative against the oxidation of fats and thereby act to extend the shelf-life of the liquid egg product. Other food-grade antioxidants which may be used include ascobyl palmitate and rosemary extract. The addition of tocopherols also serves to enhance the vitamin E content of the product. The tocopherols are added in an amount of about 0.01 to about 0.03 wt %.

One specific liquid egg product provided herein may comprise, in a 400 kg batch:

| | |
|---|---|
| Liquid Albumen | 354.9 kg |
| Liquid egg yolk | 30.82 kg |
| Menhaden fish oil | 12.80 kg |
| Powdered lecithin | 600 g |
| β-carotene | 200 g |
| citric acid | 240 g |
| prehydrated xanthan gum | 240 g |
| Egg yolk flavor | 120 g |
| Vitamin E | 80 g |
| | 400 kg |

Other specific formulations which may be employed include:

| Ingredient | Level |
|---|---|
| A | |
| Liquid Albumen | 377.3 kg |
| Omega Pur (menhaden oil) | 12.80 kg |
| Vitamin Premix | 3.00 kg |
| Beta Carotene | 0.20 kg |
| Colour (egg) | 0.12 kg |
| Xanthan Gum | 0.40 kg |
| Citric Acid | 0.24 kg |
| Lecithin | 0.24 kg |
| Flavour | 4.80 kg |
| Tocopherol | 0.90 kg |
| Total | 400 kg |
| B | |
| Liquid Albumen | 385.59 kg |
| Omega Pur (menhaden oil) | 12.80 kg |
| Beta Carotene | 240 g |
| Xanthan and Arabic Gum | 400 g |
| Citric Acid | 240 g |
| Lecithin | 600 g |
| Colour | 12 g |
| Flavour | 48 g |
| Tocopherol | 70 g |
| Total | 400 kg |
| C | |
| Liquid Albumen | 320.00 kg |
| Liquid Yolk | 27.04 kg |
| Menhaden Oil | 51.00 kg |
| Lecithin | 1.40 kg |
| Xanthan and Arabic Gum | 0.48 kg |
| Tocopherol | 0.08 kg |
| Total | 400 kg |

Following completion of the blending in of the various components of the emulsified egg product, the product is homogenized by applying physical forces to the product and then pasteurized. It is important to avoid separation of the fish oil from the egg product to effect such homogenization, which may be effected at a pressure about 100 to about 2000 psi, preferably about 1400 psi, depending on the degree of homogenicity required. Such homogenization procedures are well known in the art and may be carried out on different types of equipment. The homogenization step reduces the particle size of suspended materials, including egg yolk, in the composition and the potential for separation of suspended materials from the composition. Higher pressures result in smaller particle sizes and permit longer production runs on different design equipment. The position and pressure used vary with the heat-treating set-up used.

Pasteurization may be effected at a time and temperature under conditions to cause at least a nine D cycle (9D) reduction in *Salmonella* in the product being heated, such as at least about 60° C. for 3.5 minutes. Preferably, the product is treated under time and temperature conditions to achieve ultrapasteurization and a consequentially longer shelf-life. For example, ultrapasteurization may be effected for about 90 seconds at about 69° C. or about 210 seconds at about 65° C.

Following pasteurization, the liquid egg product is cooled to refrigeration temperature (about 4° C.) and packaged. Alternatively, the liquid egg product may first be packaged and then pasteurized or ultrapasteurized in the package.

The egg product also may be provided in frozen form and retains its functionality in that form for at least six months. The liquid egg product may be used in cooked frozen egg pastries, omelettes and other similar frozen products. The product provided herein may be employed as such to provide the cooked egg products referred to above or may be used in a variety of food products, such as cake mixes. They may also be used in smoothies, salad dressings and protein beverages.

In a human clinical trial, as described in detail below, 250 g of emulsified egg product containing n-3 fatty acids were fed to recipients, which delivered approximately 10% of the subjects daily calories and 1.3 g/day of EPA and DHA, more than the quantity obtained by consumption of similar calories of same types of fish e.g. tuna, trout and halibut. Analysis of the fatty acid composition of serum phospholipids has been shown to be a marker of dietary n-3 fatty acid intake, thus indicating that consumption of the egg product did increase EPA and DHA intake, respectively by 210% and 96%.

Triglycerides and the triglycerides to HDL-cholesterol ratio have been shown to act as independent risk factors for cardiovascular disease (CVD). In the human trial reported below, it was found that the n-3 fatty acids contained in the egg product caused a 32% reduction in plasma triglyceride concentrations, and a 37% reduction in the ratio of triglyceride to HDL-cholesterol, an effect that can be estimated to reduce the risk of CVD by 10% in males. The effect is similar to an effect that has been reported by pharmaceutical intervention with gemfibrozil. The emulsified egg product produced herein can reduce CVD while delivering a complete nutritional package and offers the potential to lower the cost of health care.

DESCRIPTION OF PREFERRED EMBODIMENT

Referring to the drawing, shell eggs are received, usually at a temperature below about 13° C. and inspected and qualified and stored, generally at a temperature below about 10° C. Shell eggs are washed, generally using an alkaline washing medium generally at a pH of at least about 10 and having a temperature generally of at least about 43° C. and at least about 11° C. higher than that of the eggs to avoid the infiltration of bacteria into the eggs. The washing water is renewed at least every four hours to reduce the accumulation of bacteria in the water.

Following washing, the eggs are selectively scanned for quality and then a disinfecting solution is applied to the eggs to reduce bacteria which may have adhered to the shell. The disinfecting solution generally has an available chlorine concentration of at least about 100 ppm, but not exceeding 200 ppm.

Eggs then are broken (6) and whole egg out of the shell is separated into albumen and yolk. The white and yolk are then blended together in the desired ratio, 92:8 in this preferred embodiment. The blend then is filtered (8) to ensure elimination of any pieces of shell or other foreign materials using a filter of any desired size, such as 1.6 mm mesh size. The blended liquid egg then is cooled (9) down to under about 4° C. within about 2 hours of breaking and stored (10) such as in clean stainless steel refrigerated silos. The liquid egg is usually stored for no longer than 24 hours.

The albumen and yolk are blended (11) with other components. In this preferred embodiment, 30.82 kg of yolk and 165 kg of albumen are mixed for 60 seconds. While mixing, the remaining 190 kg of albumen is added. 600 g of lecithin, 240 g of beta carotene, 240 g of citric acid and 200 g of prehydrated xanthan gum is mixed into the blend in a maximum period of about 45 seconds. Thereafter, 120 g of egg yolk flavor, 80 g of vitamin E and 12.80 kg of menhaden oil are added to the blend and the mixture blended thoroughly for 2 minutes at 1735 rpm.

The blend then again is filtered (12) using any convenient mesh size, such as 1.6 mm mesh, to eliminate any remaining shell and foreign material. This blend then may be stored (13), for example, using clean stainless steel refrigerated silos. The liquid egg blend is cooled down to under 4° C. within two hours of breaking and stored for no longer than 24 hours.

The liquid egg is passed by a magnet (14) to remove any metal particles from the blend before passing through a homogenizer at 1400 psi (15) and then ultrapasteurized at a temperature of about 68° C. or above for 90 seconds. The pasteurized blend is cooled down to below 4° C. within 2 hours following pasteurization in product storage vessels (16), such as clean stainless steel refrigerated silos.

The ultrapasteurized liquid egg product, after storage for no longer than 24 hours, is packaged under sanitary or aseptic conditions in good quality containers. The filled containers are immediately transferred to the refrigerated finished product storage, where the containers are maintained below 4° C.

EXAMPLES

Example 1

This Example describes the preparation of liquid egg product in accordance with one aspect of the invention (see FIG. 1).

Whole egg was separated into albumen and yolk and the albumen and yolk blended together at a ratio of 92% to 8% respectively. Liquid egg was filtered using 1.6 mm mesh to eliminate foreign materials, such as pieces of egg shell. 30.82 kg of yolk and 165 kg albumen were mixed for 60 seconds. During such mixing, the remaining 190 kg of albumen was added along with 600 g of powdered lecithin, 200 g of beta-carotene, 240 g of citric acid and 240 g of prehydrated xanthan gum, added over a period of 45 seconds. To this mixture was added, 120 g of egg yolk flavour, 80 g of vitamin E and 12.80 kg of menhaden fish oil and the mixture blended thoroughly for 2 minutes at 1735 rpm.

The resulting 400 kg of emulsified liquid egg product was again filtered using a 1.6 mm mesh filter to ensure elimination of foreign materials, including shell, and subjected to ultra-pasteurization. The emulsified liquid egg was heated to 68.5° C., homogenized at 1400 psi and held for 90 seconds at 68° C. or above to effect ultrapasteurization. The pasteurized blend then was cooled to below 4° C. within two hours of pasteurization.

Example 2

This Example shows the results of a clinical trial conducted using the whole liquid egg product of Example 1.

Two groups of 16 healthy males aged 30 to 65 and having normal to moderately elevated fasting triglycerides (>1.0 mmol/L) were served breakfast for 21 straight days, each serving amounting to 2500 calories. All subjects had not consumed fish or fish oil capsules two weeks prior to the study. One group was fed scrambled eggs prepared from the liquid egg product of Example 1 containing 1.7 g of total omega-3 fatty acids and 1.4 g total of EPA+DHA (0.7 g/day of each), with toasted white bread, non-hydrogenated light margarine, orange or apple juice, and tea or coffee with milk and/or sugar. The control group had a breakfast consisting muffins, back bacon, frozen waffles, non-hydrogenated light margarine and syrup, orange or apple juice and tea or coffee with milk and/or sugar, which provided 0.05 g/day EPA and 0.2 g/day DHA. The two different breakfasts were balanced for energy, protein, carbohyderate and total fat content. None of the subjects in the trial consumed fish or fish oil capsules during the trial. The subjects were tested for a variety of parameters, including body weight, blood pressure and resting heart rate. A fasting blood sample was taken from subjects after fasting overnight (at least 12 hours) and analyzed at the beginning (day 0) and at the end (day 22) of the trial. The subjects had no adverse effects while on either of the breakfasts. Further, no detection of a fishy taste in the emulsified egg breakfast was reported.

After the initial trial and following a wash-out period of 10 weeks, the groups were reversed and the trial repeated. The results of the two trials were combined and tabulated and appear in the following Tables I and II:

TABLE I

EFFECTS OF BREAKFAST MEALS ON CARDIOVASCULAR RISK FACTORS*

| VARIABLE | EMULSIFIED EGG BREAKFAST | | | | CONTROL BREAKFAST | | | |
|---|---|---|---|---|---|---|---|---|
| | BASAL | FOLLOW UP | MEAN CHANGE (95% CI) | P VALUE† | BASAL | FOLLOW UP | MEAN CHANGE (95% CI) | P VALUE† |
| Weight (kg) | 89.8 ± 18.0 | 90.0 ± 18.0 | 0.2 (−2.3 to 3.1) | 0.77 | 89.5 ± 17.6 | 89.4 ± 17.7 | 0.1 (−1.0 to 0.9) | 0.91 |
| Body Mass Index (kg/m²) | 28.6 ± 5.8 | 28.7 ± 5.7 | 0.0 (−0.4 to 0.5) | 0.81 | 28.5 ± 5.6 | 28.5 ± 5.7 | −0.02 (−0.2 to 0.1) | 0.70 |
| Systolic Blood Pressure (mmHg) | 137.6 ± 15.6 | 128.6 ± 15.3 | −9.0‡ (−14.4 to −3.6) | 0.0030 | 132.2 ± 21.9 | 131.3 ± 17.9 | −0.8 (−9.0 to 7.3) | 0.83 |
| Dystolic Blood Pressure (mmHg) | 90.0 ± 8.7 | 83.4 ± 8.0 | −6.5 (−10.5 to −2.6) | 0.0033 | 83.9 ± 14.5 | 83.7 ± 8.4 | −0.2 (−6.8 to 6.4) | 0.95 |
| Mean Arterial Pressure (mmHg) | 105.9 ± 10.2 | 98.5 ± 9.4 | −7.4‡ (−11.1 to −3.6) | 0.0009 | 100.0 ± 14.7 | 99.6 ± 10.0 | −0.4 (−6.1 to 5.2) | 0.88 |
| Pulse Rate (beats/min) | 74.6 ± 11.9 | 72.8 ± 13.6 | −1.9 (65.2 to 80.3) | 0.49 | 74.2 ± 11.1 | 76.0 ± 8.9 | 1.6 (−2.8 to 6.1) | 0.44 |
| Pulse Pressure | 47.7 ± 11.0 | 46.6 ± 12.4 | −1.1 (−5.5 to 3.3) | 0.10 | 45.3 ± 16.5 | 47.0 ± 14.3 | 1.7 (−5.6 to 9.0) | 0.62 |
| Arterial Stiffness Index | 58.5 ± 34.7 | 44.3 ± 18.6 | −14.2 (−31.7 to 3.3) | 0.41 | 40.4 ± 14.5 | 46.4 ± 20.5 | 6.0 (−8.9 to 20.9) | 0.40 |
| Total cholesterol (mg/dL) | 208.8 ± 40.0 | 205.2 ± 37.6 | −3.6 (−−12.7 to 5.5) | 0.009 | 208.9 ± 43.3 | 198.1 ± 34.4 | −10.9 (−22.3 to 0.6) | 0.06 |
| LDL cholesterol (mg/dL) | 132.4 ± 25.3 | 139.3 ± 27.4 | 7.0 (−1.4 to 15.4)) | 0.09 | 136.0 ± 30.3 | 130.2 ± 25.5 | −5.8 (−61.7 to 10.8) | 0.04 |
| HDL cholesterol (mg/dL) | 43.5 ± 8.1 | 47.0 ± 10.0 | 3.5 (1.0 to 5.9) | 0.0089 | 42.5 ± 6.1 | 45.5 ± 7.0 | 3.1 (0.2 to 5.9) | 0.32 |
| Triglycerides (mg/dL) | 164.8 ± 79.0 | 111.7 ± 62.2 | −53.1‡ (−77.7 to −28.5) | 0.0003 | 152.5 ± 83.5 | 127.1 ± 48.2 | −25.4 (−61.7 to 10.8) | 0.16 |
| HDL/LDL | 0.34 ± 0.07 | 0.35 ± 0.07 | 0.01 (−0.02 to 0.03) | 0.56 | 0.32 ± 0.06 | 0.36 ± 0.05 | 0.03 (0.01 to 0.05) | 0.0044 |
| Total cholesterol/HDL | 4.88 ± 1.0 | 4.49 ± 1.0 | −0.39 (−0.67 to −0.12) | 0.0078 | 4.94 ± 0.9 | 4.37 ± 0.6 | −0.57 (−0.9 to −0.2) | 0.0047 |
| Triglyceride/HDL | 3.89 ± 2.0 | 2.5 ± 1.5 | −1.42‡ (−1.9 to −0.89) | 0.0001 | 3.58 ± 1.8 | 2.83 ± 1.1 | −0.76 (−1.6 to 0.1) | 0.14 |
| Glucose (mg/dL) | 95.0 ± 17.6 | 95.7 ± 14.6 | 0.71 (−4.1 to 5.6) | 0.76 | 90.0 ± 9.0 | 95.0 ± 10.7 | 5.0 (−0.9 to 10.9) | 0.09 |

*Plus-minus values are means ± SD,
CI denotes confidence interval,
HDL high density lipoprotein,
LDL low density lipoprotein.
To convert values for cholesterol to millimoles per liter, multiply by 0.026.
To convert values for triglycerides to millimoles per liter, multiply by 0.0113.
To convert values for glucose to millimoles per liter, multiply by 0.056.
†P values are for the difference from Basal determined by a paired t-test
‡P < 0.05 for the comparison with the control group according to Least Squares Differences test

TABLE II

EFFECTS OF BREAKFAST MEALS ON SERUM PHOSPHOLIPID FATTY ACID CONCNTRATIONS*

| | EMULSIFIED EGG BREAKFAST | | | | CONTROL BREAKFAST | | | |
|---|---|---|---|---|---|---|---|---|
| VARIABLE | BASAL | FOLLOW UP | MEAN CHANGE (95% CI) | P VALUE† | BASAL | FOLLOW UP | MEAN CHANGE (95% CI) | P VALUE† |
| | % by wt of total fatty acids | | | | | | | |
| 16:0 | 27.27 ± 1.4 | 27.77 ± 1.0 | 0.51‡ (−0.15 to 1.2) | 0.12 | 27.67 ± 1.5 | 26.99 ± 1.2 | −0.68 (−1.4 to 0.03) | 0.06 |
| 18:0 | 13.43 ± 1.0 | 13.29 ± 0.8 | −0.14 (−0.69 to 0.41) | 0.59 | 13.21 ± 0.7 | 13.17 ± 0.0.6 | −0.05 (−0.44 to 0.35) | 0.80 |
| 18:1 | 11.80 ± 1.4 | 10.57 ± 1.1 | −1.23§ (−1.9 to −0.53) | 0.002 | 11.79 ± 1.1 | 12.12 ± 1.0 | 0.33 (−0.25 to 0.91) | 0.24 |
| 18:2n − 6 | 20.80 ± 2.2 | 18.20 ± 1.9 | −2.60¶ (−3.1 to −2.1) | 0.0001 | 20.72 ± 2.6 | 20.79 ± 2.0 | 0.07 (−0.87 to 1.0) | 0.88 |
| 20:3n − 6 | 3.30 ± 0.5 | 2.70 ± 0.5 | −0.60§ (−0.78 to −0.41) | 0.0001 | 3.31 ± 0.6 | 3.32 ± 0.4 | 0.01 (−0.25 to 0.27) | 0.96 |
| 20:4n − 6 (AA) | 10.26 ± 2.0 | 9.92 ± 1.5 | −0.35 (−0.87 to 0.18) | 0.18 | 10.06 ± 1.8 | 10.45 ± 1.8 | 0.39 (0.01 to 0.76) | 0.04 |
| 20:5n − 3 (EPA) | 0.63 ± 0.3 | 1.95 ± 0.5 | 1.32¶ (1.1 to 1.5) | 0.0001 | 0.69 ± 0.3 | 0.64 ± 0.2 | −0.06 (−0.12 to 0.01) | 0.09 |
| 22:5n − 3 | 0.95 ± 0.2 | 1.19 ± 0.2 | 0.25¶ (0.16 to 0.33) | 0.0001 | 0.97 ± 0.2 | 0.99 ± 0.2 | 0.02 (−0.03 to 0.07) | 0.46 |
| 22:6n − 3 (DHA) | 2.47 ± 0.5 | 4.83 ± 0.6 | 2.36¶ (2.0 to 2.7) | 0.0001 | 2.45 ± 0.6 | 2.39 ± 0.5 | −0.06 (−0.23 to 0.10) | 0.41 |
| Σn − 6 | 36.08 ± 1.6 | 32.31 ± 1.6 | −3.76¶ (−4.3 to −3.2) | 0.0001 | 35.77 ± 2.0 | 36.21 ± 1.3 | 0.44 (−0.36 to 1.2) | 0.76 |
| Σn − 3 | 4.47 ± 0.7 | 8.49 ± 1.1 | 4.03¶ (3.5 to 4.6) | 0.0001 | 4.47 ± 0.7 | 4.44 ± 0.5 | −0.04 (−0.29 to 0.21) | 0.26 |
| n − 3:n − 6 | 0.12 ± 0.02 | 0.26 ± 0.04 | 0.14¶ (0.12 to 0.16) | 0.0001 | 0.13 ± 0.02 | 0.12 ± 0.01 | −0.0007 (−0.009 to 0.007) | 0.87 |
| EPA:AA | 0.06 ± 0.03 | 0.20 ± 0.06 | 0.14¶ 0.12 to 0.17) | 0.0001 | 0.07 ± 0.02 | 0.06 ± 0.02 | −0.007 (−0.01 to −0.0002) | 0.04 |
| DHA:AA | 0.25 ± 0.08 | 0.50 ± 0.1 | 0.25¶ (0.20 to 0.29) | 0.0001 | 0.25 ± 0.08 | 0.24 ± 0.07 | −0.01 (−0.03 to 0.002) | 0.08 |

*Plus-minus values are means ± SD,
CI denotes confidence interval,
AA arachdoinic acid,
EPA eicosapentaenoic acid,
DHA docosachexaenoic acid,
†P values are for the difference from Basal determined by a paired t-test
‡P < 0.05 for the comparison with the control group according to Least Squares Differences test
§P < 0.01 for the comparison with the control group according to Least Squares Differences test
¶P < 0.001 for the comparison with the control group according to Least Squares Differences test In this randomized cross-over study, the emulsified egg breakfast containing n-3 fatty acids significantly lowered, by 32%, the plasma triglycerides (TG) and the TG: HDL-C (high density lipoprotein cholesterol) ratio, by 37%, whereas no such effects were observed with the control breakfast. The emulsified egg breakfast containing n-3 fatty acids significantly increased EPA, by 210%, DHA, by 96%, the ratio of n-3:n-6 fatty acids, by 120%, EPA:AA (arachidonicacid), by 230%, and DHA:AA, by 100%, in the serum phospholipid from the baseline. All three of the n-6 polyunsaturated fatty acids (18:2n-6, 20:3n-6 and 20:4n-6) decreased significantly with consumption of a n-3 fatty acid supplemented breakfast.

The use of the emulsified egg product prepared in Example 1 as a functional food offers significant potential for reducing selected risk factors for cardiovascular disease and has a TG (gemfibrozil-like) lowering effect.

Example 3

This Example shows the utilization of the product of the present invention in the provision of a variety of food products.

1. Smoothies

Because they are pasteurized, the liquid egg products provided herein may be added to smoothies and shakes. The following are two recipes for smoothies.

Basic Smoothie

¼ cup (50 mL) liquid egg product (Example 1), well shaken
½ cup (125 mL) ripe banana, chopped
½ cup (125 mL) clear fruit juice
¼ cup (50 mL) low-fat vanilla yogurt Berry Powerful Smoothie ¼ cup (50 mL) liquid egg product (Example 1), shaken
½ cup (125 mL) frozen raspberries, blueberries or strawberries
½ cup (125 mL) cranberryjuice
¼ cup (50 mL) low-fat vanilla yogurt
1 tbsp (15 mL) liquid honey The ingredients were combined in a blender. Each smoothie combination makes 2 cups/500 mL.

2. Caesar Salad Dressing

The liquid egg product of Example 1 may be used in the preparation of a Caesar salad dressing with reduced fat content. Because the liquid egg product is pasteurized, it is ideal for use in salad dressings. The following is a recipe.

Ingredients
4 tbsp (50 mL) liquid egg product (Example 1), well shaken
2 tbsp (30 mL) grated Parmesan cheese
2 tbsp (30 mL) red wine vinegar
1 tbsp (15 mL) lemon juice
1 tsp (5 mL) Dijon mustard
½ tsp (2 mL) Worcestershire sauce
½ tsp (2 mL) anchovy paste
¼ tsp (1 mL) pepper
2 cloves garlic
¾ cup (175 mL) extra virgin olive oil Directions In a blender, the liquid egg product, cheese, red wine vinegar, lemon juice, mustard, Worcestershire sauce, anchovy paste, pepper and garlic were blended. With the blender motor running, olive oil was drizzled in. The blend was tasted and salt added to taste.

The product may be used immediately or covered and stored in refrigerator for up to 7 days. The receive made 1 cup (250 mL). For 8 cups (2L) of romaine lettuce, ⅓ cup (75 mL) dressing is used and serves six.

3. Smoked Salmon Scramble Egg Pita

Ingredients
1 tsp (5 mL) vegetable oil
¼ cup (50 mL) finely chopped red onion
1 carton (250 mL) liquid egg product (Example 1), well shaken
½ cup (125 mL) light smoked salmon flavoured cream cheese spread
2 tbsp (30 mL) chopped chives
2 whole wheat pitas
Tomato slices
Lettuce
Salt and pepper Directions The oil was heated in a non-stick skillet set over medium heat. Onion, salt and pepper were added and cooked, stirring often, for 5 minutes or until softened. Liquid egg product was poured in and cream cheese added by the spoonful. The mixture was stirred and cooked until the eggs were softly set and the cheese was fully incorporated. The chives were then stirred in. The eggs were divided between two halved pitas. The receive serves four.

SUMMARY OF THE DISCLOSURE

In summary of this disclosure, the present invention provides a novel liquid egg product which has fish oil homogenized therein to provide a source of omega-3 fatty acids. Modifications are possible within the scope of the invention.

What we claim is:

1. A method of forming a liquid egg composition, which consists essentially of:
  forming an emulsion of at least one omega-3 fatty acid in liquid egg, wherein said at least one omega-3 fatty acid is present in an amount of from 100 to about 1500 mg of omega-3 fatty acid per 100 g of liquid egg composition.

2. The method of claim 1 wherein said omega-3 fatty acid includes eicosapentaenoic acid (EPA) and/or docosahexaenoic acid (DHA).

3. The method of claim 2 wherein said omega-3 fatty acid is provided in the form of fish oil and said fish oil is emulsified into the liquid egg.

4. The method of claim 3 wherein said fish oil is utilized in an amount to provide about 0.65 to about 1.5 g of EPA+DHA per 125 g of liquid egg composition.

5. A method of forming a liquid egg composition, which comprises providing liquid egg white and liquid egg yolk, initially blending about 40 to about 60% of the egg white with the egg yolk, blending fish oil containing at least one omega-3 fatty acid with the blend of egg white and egg yolk and then blending the remainder of the egg white with the blend of egg white, egg yolk and fish oil, wherein said at least one omega-3 fatty acid is present in an amount of from 100 to about 1500 mg of omega-3 fatty acid per 100 g of liquid egg composition.

6. The method of claim 5 wherein, during blending of the remainder of said egg white, at least one additional component of the composition is added selected from the group consisting of an emulsifier, a food grade color when less than the full yolk proportion of the egg is used, citric acid and a thickening agent.

7. The method of claim 6 wherein, the fish oil is blended into the mixture to provide about 0.65 to about 1.5 g of EPA+DHA per 125 g of liquid egg composition.

8. The method of claim 7 wherein, following blending of the fish oil, the product is homogenized and pasteurized.

9. The method of claim 8 wherein said homogenization step is effected at a pressure of about 100 to about 2000 psi.

10. The method of claim 8 wherein said pasteurization step is effected at a temperature and for a time under conditions to cause at least a 9D reduction in *Salmonella* in the product.

11. The method of claim 8 wherein said pasteurization step is effected at a temperature and for a time under conditions to achieve ultrapasteurization.

12. The method of claim 11 wherein said time and temperature are about 90 seconds at 69° C. or about 210 seconds at about 65° C.

13. The method of claim 8 wherein the pasteurized product is cooled to refrigeration temperature and packaged.

\* \* \* \* \*